(12) United States Patent  
Grechanik et al.

(10) Patent No.: US 8,185,917 B2  
(45) Date of Patent: May 22, 2012

(54) GRAPHICAL USER INTERFACE APPLICATION COMPARATOR

(75) Inventors: Mark Grechanik, Chicago, IL (US); Qing Xie, Chicago, IL (US); Chen Fu, Downers Grove, IL (US)

(73) Assignee: Accenture Global Services Limited, Dublin (IE)

( * ) Notice: Subject to any disclaimer, the term of this patent is extended or adjusted under 35 U.S.C. 154(b) by 1093 days.

(21) Appl. No.: 12/038,661

(22) Filed: Feb. 27, 2008

(65) Prior Publication Data

US 2009/0217309 A1    Aug. 27, 2009

(51) Int. Cl.  
    *G06F 9/44*    (2006.01)  
    *G06F 11/00*    (2006.01)

(52) U.S. Cl. .......................... 719/328; 714/38

(58) Field of Classification Search ............ 719/328  
See application file for complete search history.

(56) References Cited

U.S. PATENT DOCUMENTS

| | | | |
|---|---|---|---|
| 5,781,720 A | 7/1998 | Parker et al. | |
| 6,216,212 B1* | 4/2001 | Challenger et al. | 711/163 |
| 6,898,764 B2 | 5/2005 | Kemp | |
| 6,990,654 B2 | 1/2006 | Carroll, Jr. | |
| 2003/0052917 A1 | 3/2003 | Dubovsky | |
| 2003/0202012 A1 | 10/2003 | Kemp | |
| 2003/0236775 A1 | 12/2003 | Patterson | |
| 2004/0002989 A1 | 1/2004 | Kaminer | |
| 2004/0194065 A1* | 9/2004 | McGrath et al. | 717/124 |
| 2005/0166094 A1 | 7/2005 | Blackwell et al. | |
| 2005/0204298 A1* | 9/2005 | Kemp | 715/762 |
| 2005/0204343 A1 | 9/2005 | Kisamore et al. | |
| 2005/0235274 A1 | 10/2005 | Mamou et al. | |
| 2006/0230314 A1 | 10/2006 | Sanjar et al. | |
| 2007/0006043 A1* | 1/2007 | Pins | 714/38 |
| 2007/0143327 A1 | 6/2007 | Rivas et al. | |
| 2007/0240116 A1 | 10/2007 | Bangel et al. | |
| 2007/0271203 A1 | 11/2007 | Delvat | |
| 2008/0282230 A1 | 11/2008 | Belvin et al. | |

OTHER PUBLICATIONS

Extended European Search Report dated Feb. 10, 2011 for corresponding European Patent Office Application No. 09250551.0.  
Memon et al., "Regression Testing of GUIs," Proceedings of ESEC/FSE '03, Sep. 1-5, 2003, pp. 118-127, Helsinki, Finland, XP-002617924.  
Memon et al., "Automating Regression Testing for Evolving GUI Software," *Journal of Software Maintenance and Evolution: Research and Practice*, vol. 17, No. 1, Jan. 1, 2005, pp. 27-64, XP002617925.  
Compuware, The Leader in IT Value, "Accelerate Testing and Deliver High Quality Applications on Time," 2008 Compuware Corporation, 2 pages.

(Continued)

*Primary Examiner* — Andy Ho  
*Assistant Examiner* — Abdou Seye  
(74) *Attorney, Agent, or Firm* — Brinks Hofer Gilson & Lione

(57) ABSTRACT

A graphical user interface (GUI) application comparator helps application designers create error free graphical user interface applications (GAPs). The comparator finds differences in the GUI elements used to compose an interface between a current GAP version and a subsequent GAP version. One benefit is that a test script writer may better understand how the GAP has evolved in order to write a better test script. Another benefit is that the comparator output may be analyzed by subsequent processing systems for automated analysis of test scripts.

16 Claims, 12 Drawing Sheets

OTHER PUBLICATIONS

Grechanik et al, "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

IBM, "Rational Robot, Features and Benefits," "Rational Software," undated, 1 page.

IBM, "Rational Robot, Overview," "Rational Software," undated, 1 page.

Pierce, Benjamin C., "Types and Programming Languages," The MIT Press, Cambridge, Massachusetts, 2008, ISBN 0-262-16209-1, complete book.

First Office Action dated Jun. 24, 2011 for co-pending Chinese Patient Application No. 200910118531 X with English translation.

U.S. Pat. and Trademark Office Action dated Sep. 28, 2011 for co-pending U.S. Appl. No. 12/038,672.

U.S. Pat. and Trademark Office Action dated Sep. 29, 2011 for co-pending U.S. Appl. No. 12/038,665.

* cited by examiner

```xml
- <State SeqNumber="0" Name="State_0_3556" Alias="University Directory0"
    ProcessId="3556">
  - <GUIElement Alias="StateList">
      ...
    - <GUIElement Alias="System">
        ...
      - <GUIElement Alias="SchoolListbox">
          <UniqueID>0x3c2</UniqueID>
          <HWND>0x90b52</HWND>
          <Location x="173" y="486" width="336" height="274" />
          <Class>WindowsForms10.LISTBOX.app4</Class>
          <Style>0x560100c1</Style>
          <ExStyle>0xc0000a00</ExStyle>
        - <GUIElement Alias="SchoolListbox">
            <UniqueID>0x3cb</UniqueID>
            <HWND>0x90b52</HWND>
            <Location x="175" y="488" width="332" height="270" />
            <Class>WindowsForms10.LISTBOX.app4</Class>
            <Style>0x560100c1</Style>
            <ExStyle>0xc0000a00</ExStyle>
          </GUIElement>
        </GUIElement>
        ...
      </GUIElement>
    </GUIElement>
  </State>
```

Figure 3

```
- <State SeqNumber="0" Name="State_0_3068" Alias="University Directory1"
    ProcessId="3068">
  - <GUIElement Alias="StateList">
      ...
    - <GUIElement Alias="System">
        ...
      - <GUIElement Alias="SchoolCombobox">
          <UniqueID>0xa8</UniqueID>
          <HWND>0x90e66</HWND>
          <Location x="248" y="653" width="299" height="24" />
          <Class>WindowsForms10.COMBOBOX.app.0.378734a</Class>
          <Style>0x560100242</Style>
          <ExStyle>0xc0000800</ExStyle>
        - <GUIElement Alias="SchoolCombobox">
            <UniqueID>0xb1</UniqueID>
            <HWND>0x90e66</HWND>
            <Location x="248" y="653" width="299" height="24" />
            <Class>WindowsForms10.COMBOBOX.app.0.378734a</Class>
            <Style>0x560100242</Style>
            <ExStyle>0xc0000800</ExStyle>
          - <GUIElement Alias="SchoolCombobox">
              <UniqueID>0xb2</UniqueID>
              <HWND>0x80e94</HWND>
              <Location x="251" y="656" width="276" height="18" />
              <Class>Edit</Class>
              <Style>0x50000380</Style>
              <ExStyle>0xc0000800</ExStyle>
              ...
            </GUIElement>
          </GUIElement>
        </GUIElement>
        ...
      </GUIElement>
    </GUIElement>
  </State>
```

Figure 4

```
                        506                                                500
                         ↙                                                  ↙
...
<Version>0
    ...
    -<GUIElement Alias="SchoolListbox">                    ⎫
        <UniqueID>0x3c2</UniqueID>                         ⎪
        <HWND>0x90b52</HWND>                               ⎪
        <Location x="173" y="486" width="336" height="274" />
        <Class>WindowsForms10.LISTBOX.app4</Class>         ⎪
        <Style>0x560100c1</Style>                          ⎪
        <ExStyle>0xc0000a00</ExStyle>                      ⎪
        -<GUIElement Alias="SchoolListbox">                ⎬ 502
            <UniqueID>0x3cb</UniqueID>                     ⎪
            <HWND>0x90b52</HWND>                           ⎪
            <Location x="175" y="488" width="332" height="270" />
            <Class>WindowsForms10.LISTBOX.app4</Class>     ⎪
            <Style>0x560100c1</Style>                      ⎪
            <ExStyle>0xc0000a00</ExStyle>                  ⎪
        </GUIElement>                                      ⎪
    </GUIElement>                                          ⎭
    ...
</Version>      508
    ...         ↙
<Version>1
    ...
    -<GUIElement Alias="SchoolCombobox">                   ⎫
        <UniqueID>0xa8</UniqueID>                          ⎪
        <HWND>0x90e66</HWND>                               ⎪
        <Location x="248" y="653" width="299" height="24" />
        <Class>WindowsForms10.COMBOBOX.app.0.378734a</Class>
        <Style>0x560100242</Style>                         ⎪
        <ExStyle>0xc0000800</ExStyle>                      ⎪
        -<GUIElement Alias="SchoolCombobox">               ⎪
            <UniqueID>0xb1</UniqueID>                      ⎪
            <HWND>0x90e66</HWND>                           ⎪
            <Location x="248" y="653" width="299" height="24" />
            <Class>WindowsForms10.COMBOBOX.app.0.378734a</Class>  ⎬ 504
            <Style>0x560100242</Style>                     ⎪
            <ExStyle>0xc0000800</ExStyle>                  ⎪
            -<GUIElement Alias="SchoolCombobox">           ⎪
                <UniqueID>0xb2</UniqueID>                  ⎪
                <HWND>0x80e94</HWND>                       ⎪
                <Location x="251" y="656" width="276" height="18" />
                <Class>Edit</Class>                        ⎪
                <Style>0x50000380</Style>                  ⎪
                <ExStyle>0xc0000800</ExStyle>              ⎪
                ...                                        ⎪
            </GUIElement>                                  ⎪
        </GUIElement>                                      ⎪
    </GUIElement>                                          ⎭
    ...
</Version>
    ...
```

Figure 5

Property 1 if $x$ is the root of $g_1$ and $y$ is the root of $g_2$, then $x \sim y$;

Property 2 if $x \sim y$ and one of $x$ or $y$ is the root node in its graph, then the other node is the root node as well;

Property 3 if $x \sim y$ and $\text{type}(x) = \text{type}(y)$, and nodes $x$, $y$ are not tagged as potentially deleted, and $x \xrightarrow{r} x'$ in $g_1$, then there exists an edge $y \xrightarrow{s} y'$ in $g_2$, with the same labels $r=s$, $r \neq \diamond$ and $s \neq \diamond$, and $\max(r) = \max(s)$ and $\min(r) = \min(s)$, and $\text{type}(x') = \text{type}(y')$, such that $x' \sim y'$;

Property 4 conversely, if $x \sim y$ and $\text{type}(x) = \text{type}(y)$, and nodes $x$, $y$ are not tagged as potentially deleted, and $y \xrightarrow{r} y'$ in $g_2$, then there exists an edge $x \xrightarrow{l} x'$ in $g_1$, with the same label $l$, $l \neq \diamond$, and $p=k$ and $m=q$, and $\text{type}(x') = \text{type}(y')$, such that $x' \sim y'$.

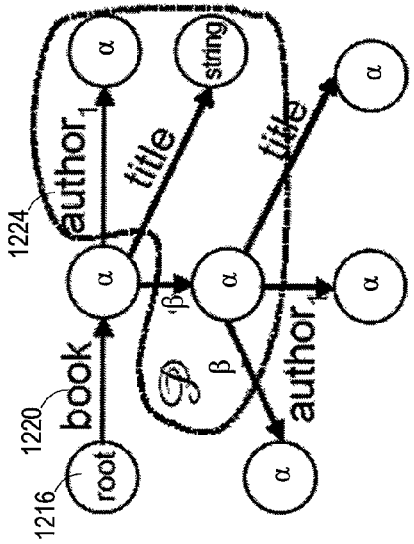

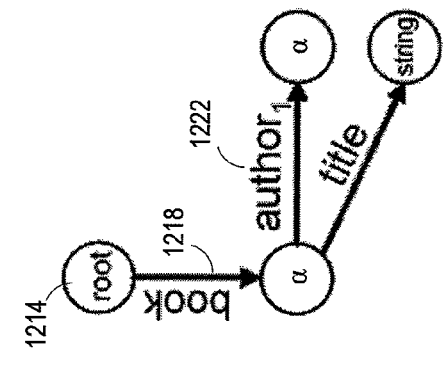

FIG. 12

GRAPHICAL USER INTERFACE APPLICATION COMPARATOR

CROSS REFERENCE TO RELATED APPLICATIONS

This application is related to following applications, all filed on the same day: U.S. patent application Ser. No. 12/038,665, filed Feb. 27, 2008; U.S. patent application Ser. No. 12/038,672, filed Feb. 27, 2008; U.S. patent application Ser. No. 12/038,676, filed Feb. 27, 2008; U.S. patent application Ser. No. 12/038,658, filed Feb. 27, 2008; and U.S. patent application Ser. No. 12/038,675, filed Feb. 27, 2008.

BACKGROUND OF THE INVENTION

1. Technical Field

This application relates to graphical user interfaces. In particular, this application relates to determining differences between graphical user interfaces.

2. Related Art

The relentless pace of advancing technology has given rise to complex computer software applications that assist with almost every aspect of day-to-day life. These applications exist in virtually every field, such as analyzing radio telescope signals for signs of intelligent life among the stars, finding new oil deposits under the earth, and designing new automobiles. One nearly ubiquitous feature of these applications is that they employ graphical user interfaces (GUIs). Another nearly ubiquitous aspect of GUI applications (GAPs) is that they are complex, difficult to design, and difficult to debug.

In the past it has generally been easier to implement the GUI to the application than to thoroughly test the GAP logic. For GAPs of any significant complexity, the permutations and combinations of GUI elements give rise to an enormous field of potential interactions with GUI elements, other GAPs, and logic execution that could have bugs of any severity, from insignificant to critical failure. Exacerbating the problem is that application developers are under pressure to continually add new features, update the GUI, and release new versions of applications.

Manually testing large-scale enterprise GAPs is tedious, error prone, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with the GAP by performing actions on the GAP GUI objects. These testing procedures operate on the GAP after it has been designed, built, and is in executable form. During the design of the GAP, however, little guidance was available to the designer for how to build and debug the GAP itself.

Therefore, a need exists to address the problems noted above and others previously encountered.

SUMMARY

A graphical user interface application comparator helps application designers create error free graphical user interface applications (GAPs). The comparator finds differences in the GUI elements used to compose an interface between a current GAP version and a subsequent GAP version. One benefit is that a test script writer may better understand how the GAP has evolved in order to write a better test script for the subsequent version. Another benefit is that the comparator output may be analyzed by subsequent processing systems for automated analysis of test scripts.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 3 shows a portion of a current GAP GUI model that provides a GAP representation as a model for analysis.

FIG. 4 shows a portion of a subsequent GAP GUI model that provides a GAP representation as a model for analysis.

FIG. 5 shows a portion of a GUI difference model.

FIG. 12 shows an example of bi-simulation properties.

DETAILED DESCRIPTION OF THE PREFERRED EMBODIMENTS

Figure 1:
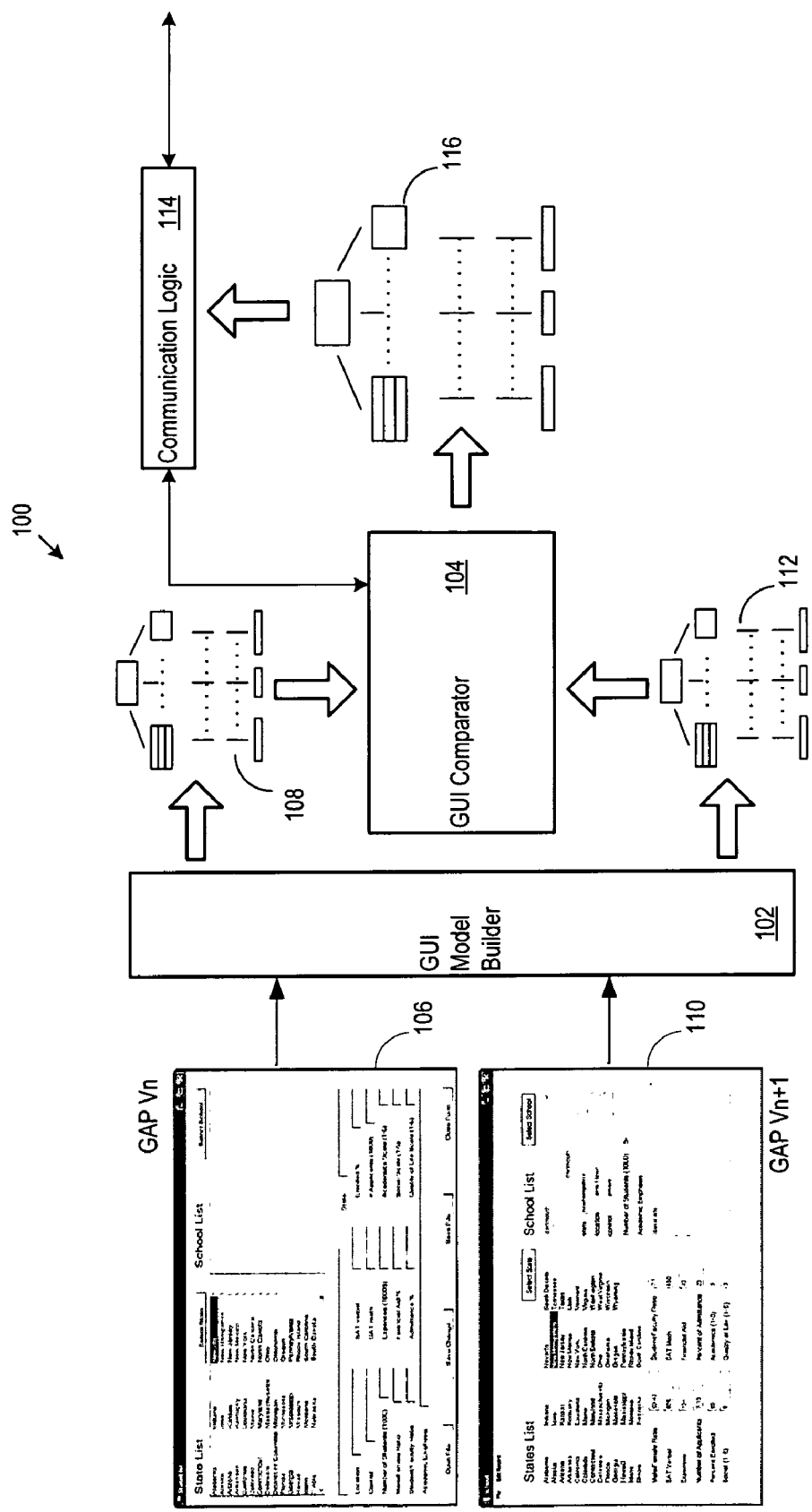
FIG. 1 shows a Graphical User Interface (GUI) Application (GAP) comparator system.

FIG. 1 shows a graphical user interface (GUI) application comparator system ("system") 100. The system 100 may include a GUI model builder 102 and a GUI comparator 104. The GUI model builder 102 may accept a GUI application (GAP) version 'n' ("GAP Vn") 106 and create a GAP Vn GUI model 108. The GUI model builder 102 may also accept a GAP version 'n+1' ("GAP Vn+1") 110 and create a GAP Vn+1 GUI model 112. The GUI comparator 104 may accept the GAP Vn GUI model 108 and the GAP Vn+1 GUI model 112, as well as information received through the communication logic 106, to create a GUI difference model 116. The GUI difference model 116 may be sent to other systems through the communication logic 106. The GAP GUI models 108 and 112 may have a flat, tree, hierarchical, nested, or other type of structure. The GAP Vn 114 may be a current version of a particular GAP, while the GAP Vn+1 110 may be a subsequent version of the GAP. The GAP Vn GUI model 108 may provide a representation of the GUI structure of the current GAP version, while the GAP Vn+1 GUI model 112 may provide a representation of the GUI structure of the subsequent GAP version.

Figure 2:
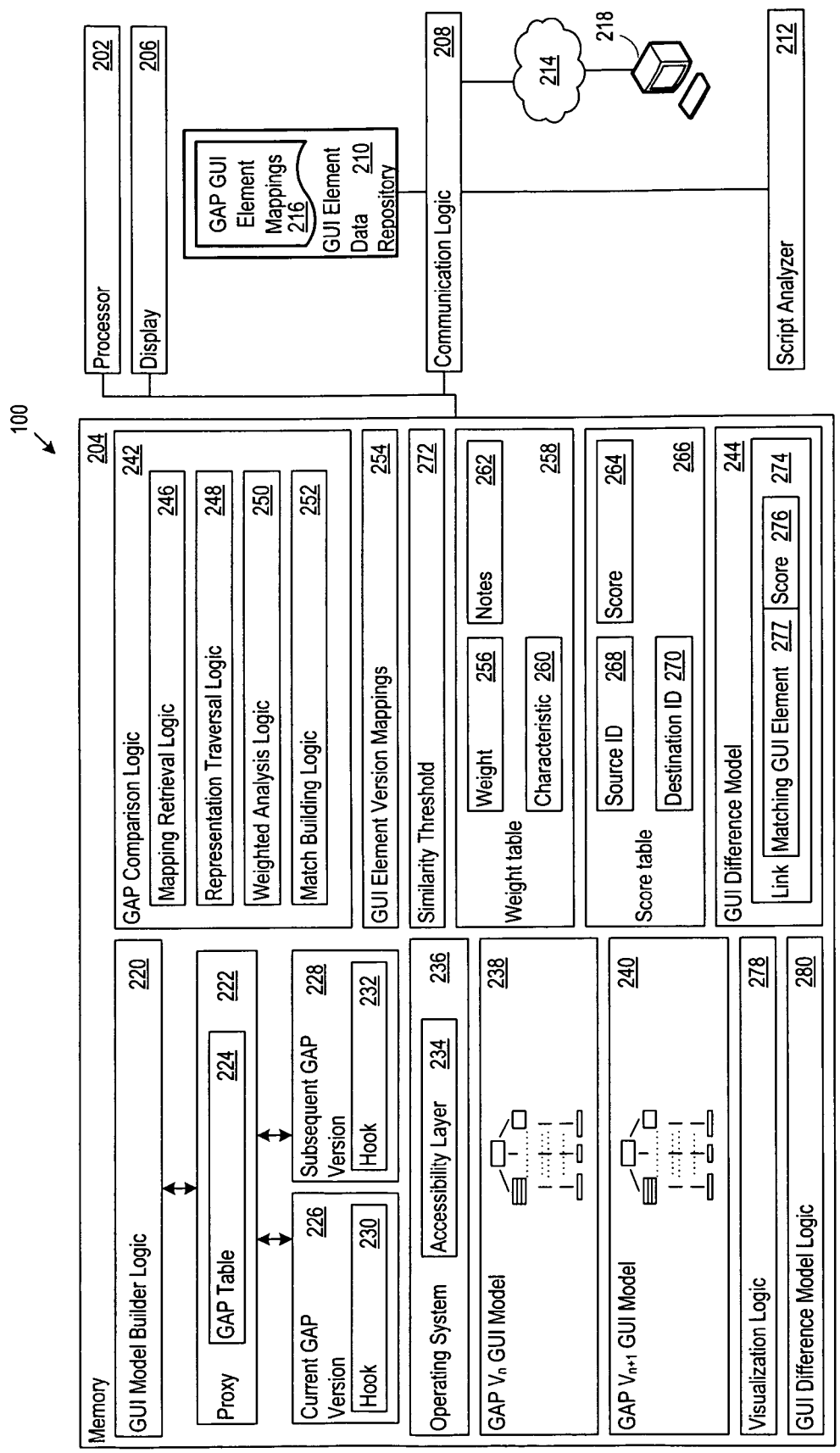
FIG. 2 shows a GAP comparator system.

FIG. 2 shows an implementation of the GUI application comparator system 100. The system 100 may include a processor 202, a memory 204, and a display 206. The system 100 may exchange information with other systems, such as a GUI element data repository ("repository") 210, a script analyzer 212, and a network 214 through a communication logic 208.

The communication logic 208 may be a wired/wireless interface, inter-process communication mechanism, shared memory, web services interface, or any other types of communication interface. The repository 210 may include GAP GUI element mappings 216. The network 214 may connect to local or remote terminals 218 for local or remote operator interaction with the system 100, to other processes running on other machines, or to other entities that interact with the system 100.

The memory 204 may include GUI model builder logic 220. The GUI model builder logic 220 may communicate with a proxy 222. The proxy 222 may be stored in the memory 204 and access a GAP table 224. The proxy 222 may communicate with GAPs, such as a current GAP version 226 and a subsequent GAP version 228. The current GAP version 226 and subsequent GAP version 228 may already reside in the memory 204. Alternatively or additionally, the system 100 may request and receive the current GAP version 226 and the subsequent GAP version 228 through the communication logic 208, whereupon the current GAP version 226 and the subsequent GAP version may be stored in the memory 204.

The proxy 222 may include logic that inserts the hooks 230 and 232 into a process space of the GAPs 226 and 228. The proxy 222 may communicate with the hooks 230 and 232. In particular, the proxy 222 may exchange messages with the hooks 230 and 232 to obtain the state of any or all of the GUI elements in the GAPs 226 and 228. The hooks 230 and 232 may be programs that respond to messages from the proxy 222 and may interact through an accessibility layer 234 of an operating system 236 to discover and report information about the GUI elements in the GAPs 226 and 228 to the proxy. The accessibility layer 234 may expose an accessibility interface through which the proxy 222 and hooks 230 and 232 may invoke methods and set and retrieve GUI element values and characteristics, and thereby select, highlight, control, modify, assign identifiers for, or otherwise interact with the GUI elements in the GAPs.

The Microsoft™ Active Accessibility (MSAA) layer is one example of a suitable accessibility layer. In this regard, the GAPs 226 and 228 expose the accessibility interfaces that export methods for accessing and manipulating the properties and behavior of GUI elements. For example, the GAPs 226 and 228 may employ the IAccessible interface to allow access and control over the GUI element using MSAA application programming interface (API) calls. The IAccessible interface further facilitates applications to expose a tree of data nodes that make up each window in the user interface currently being interacted with. The GUI model builder logic 220 and proxy 222 may then include program statements to access and control the GUI element as if the GUI element was a conventional programming object. Accessibility API calls may include: perform actions on objects, get values from objects, set values on objects, navigate to objects, and set properties on objects, and other calls.

The proxy 222 may be a daemon program and may start prior to the GUI model builder logic 220. The proxy 222 may be aware of one or more GAPs. When the proxy 222 starts, it may load the GAP table 224, which may include a predefined set of GAP entries for which the proxy 222 is aware. A GAP entry may take the form:

<Alias, <File0, Path0, Dir0, CommandLine0>, <File1, Path1, Dir1, CommandLine1>> where Alias may be a unique pre-defined name for the GAP (e.g., a name generic to both the current GAP version 226 and the subsequent GAP version 228), File0 may be the name of the executable program for the current GAP version 226, Path0 may be the absolute path to File0, Dir0 may be the absolute path to the directory from which File0 should execute, and CommandLine0 may specify command line arguments for File0. File1, Path1, Dir1, and CommandLine1 provide similar parameters for the subsequent GAP version 228.

When the GUI model builder logic 220 starts, it may connect to the proxy 222. Once connected, the GUI model builder logic 220 may request the GAP table 224 by sending a GAP table request message to the proxy 222. The proxy 222 may respond by sending a GAP table response message including the GAP table 224 to the GUI model builder logic 220. An example message exchange is shown in Table 1:

TABLE 1

GAP table request message
<GetGapTable/>
GAP table response message
<GapTable>
  <GAP Alias = "name"
    <V_N File="gap.exe" Path="c:\path\N" CommandLine="-c1"/>
    <V_N1 File="gap.exe" Path="c:\path\N1" CommandLine="-c1"/>
  </GAP>
</GapTable>

The GUI model builder logic 220 may then provide a list of GAPs from which an operator may choose. The operator may access the system 100 either locally through the display 206 or remotely, e.g. through the terminal 218. The GUI model builder logic 220 may then create a GAP load message, e.g., <LoadGap Alias="name"/> and send the GAP load message to the proxy 222 to start any selected GAP (which may then display its user interface). One GAP load message may cause the proxy 222 to start multiple versions of a GAP identified together in the GAP table 224 in the <GAP> section.

After starting the GAPs, the proxy 222 may inject hooks into the GAPs' process space. The hook may connect to the proxy 222 and send a confirmation message (e.g., <GAP File="gap.exe" Instance="192"/>). The proxy 222 may send a success message (e.g., <Loaded Alias="name" VN="192" VN1="193"/>) to the GUI model builder logic 220, thereby acknowledging that the GAPs are started successfully.

The GUI model builder logic 220 may request the current state of each started GAP. In that regard, the GUI model builder logic 220 may send a state request message (e.g., <GetState Alias="name"/>) to the proxy 222. In turn, the proxy 222 may locate the connection to the corresponding hooks of the GAPs and send a state request message (e.g., <GetState/>) to the hooks. The hooks may create a GAP state (including unique identifiers for GUI elements), such as a state tree, encode it (e.g., in XML format), and send it to the proxy 222. The proxy 222 may forward the GAP state to the GUI model builder logic 220. An example GAP state message sent by the proxy 222 is shown in Table 2.

TABLE 2

GAP state message
<State SeqNumber="1" Name="name" Alias="name" ProcessID="972">
  <GUIElement Alias="name">
    <Location x="15" y="200" width="23" height="98"/>
    <Description>Action</Description>
    <DefAction>Action</DefAction>
    <UniqueID>0xcafebabe</UniqueID>
    <Class>LISTBOX</Class>
    <Values>
      <Value SeqNumber="1">someval</Value>
      ..........................

TABLE 2-continued

```
        </Values>
    </GUIElement>
    ...............
</State>
```

The GAP state contains information about the GUI elements composing a given screen, as well as the values of these elements and their assigned identifiers. The GAP state specifies the GAP GUI elements and the values of the GUI elements. In one implementation the GAP state is reflected in an extensible Markup Language (XML) structure where the element 'State' has one or more children elements 'GAP' whose children elements are in turn 'GUIElement's. For example, GUI elements may be either containers or basic. Container GUI elements contain other elements, while basic elements do not contain other elements. The XML structure reflects the containment hierarchy by allowing GUIElements to contain other GUIElements.

In the XML structure, the attribute SeqNumber may designate a unique sequence number of the state within the GAP. Since states are mapped to GUI screens, each state may be given a name which is specified by the optional attribute 'Name'. The attributes Alias and ProcessID may denote the alias of the GAP and its instance process identifier respectively. The instance process identifier may differentiate between the current GAP version and the subsequent GAP version.

The GUI model builder logic 220 may construct GAP GUI models based on the GAP state messages received from the proxy 222. For example, the GUI model builder logic 220 may construct a GAP Vn GUI model 238 from GAP state messages regarding the current GAP version 226. Similarly, the GUI model builder logic 220 may construct a GAP Vn+1 GUI model 240 from GAP state messages regarding the subsequent GAP version 228.

The processor 202 may invoke GAP comparison logic 242 stored in the memory 204. The GAP comparison logic 242 may compare two GAP GUI models, such as GAP GUI models 238 and 240, and produce a GUI difference model 244. The GAP comparison logic 242 may include mapping retrieval logic 246, representation traversal logic 248, weighted analysis logic 250, and match building logic 252.

The mapping retrieval logic 246 may request particular GAP GUI element mappings from the GAP GUI element mappings 216 in a GUI element data repository 210 and store the particular GAP GUI element mappings in the memory 204 as GUI element version mappings 254.

The representation traversal logic 248 may traverse a GAP GUI model, such as GAP Vn GUI model 238. For example, the representation traversal logic 248 may determine the next node to visit in either of the GAP GUI models 238 and 240. Alternatively or additionally, the representation traversal logic 248 may traverse all or parts of a GUI difference model, such as GUI difference model 244. The next node to visit may be determined, as examples, in depth-first or breadth-first fashion.

The weighted analysis logic 250 may use GUI characteristic weights 256 obtained from a weight table 258 to determine a similarity value between a GUI element within a first GAP GUI model, such as the GAP Vn GUI model 238, and each GUI element within a second GAP GUI model, such as the GAP Vn+1 GUI model 240. Different GUI characteristic weights 256 may be assigned to the similarities or differences between different GUI element characteristics 260 or properties that may be present or absent between the GUI elements in the two GAP GUI models. The GUI element characteristics 260 may include GUI element characteristics such as size, XY position, color, window position, font type, font size, border style, background color, foreground color, Read-only/Read-Write, or any other GUI element characteristic. Alternatively or additionally, the GUI element characteristics 260 may include an accessibility layer Role, Class, Style, Extended Style, number of Children, Level within a tree or hierarchy, Name of the GUI element, or other accessibility layer-assigned properties. The weight table may also include notes 262 associated with the weights 256 assigned to the GUI characteristics 260 that may explain the rationale behind each weight value.

The weighted analysis logic 250 may store a score 264 in a score table 266 based on each similarity value generated by the weighted analysis logic 250. Each score 264 in the score table 266 may correspond with a source identifier 268 and a destination identifier 270. The source identifier 268 and destination identifier 270 may be a unique value or combination of values (e.g., including GAP aliases) identifying the GAPs and GUI elements that the weighted analysis logic 250 compared to calculate each score 264.

The match building logic 252 may compare the similarity values generated by the weighted analysis logic 250 and/or the scores 264 stored in the score table 266 against a similarity threshold 272. This comparison may determine whether two GUI elements are sufficiently similar to be considered a match from the current GAP version to the subsequent GAP version. The match building logic 252 may create a link between matching GUI elements in the GUI difference model 244. The link may be stored in the GUI element representation within the GUI difference model 244 as a GUI element link 274 with an optional corresponding matching score 276. The GUI element link may comprise an identifier of a second GUI element 277. The identifier may be the source identifier 268, the destination identifier 270, or both.

In operation, the GAP comparison logic 242 may obtain the GAP GUI models 238 and 240 by retrieving them from the memory 204, by calling the GUI model builder logic 220, or in another manner. The GAP comparison logic 242 may create a base GUI difference model as a root node from which the GAP GUI models 238 and 240 descend in different branches from the root. The GAP comparison logic 242 may then determine the next node to visit in each of the GAP GUI models using the representation traversal logic 248.

The GAP comparison logic 242 may initiate execution of the mapping retrieval logic 246 to obtain GUI element version mappings available from external sources, such as the metadata repository 210. The GAP comparison logic 242 may request all available GUI element version mappings, or may specifically request GUI element version mappings for the next node in the current GAP GUI model. If a GUI element version mapping is available for the next node in the current GAP GUI model, the GAP comparison logic 242 may forgo execution of the weighted analysis logic 250. Instead, the GAP comparison logic 242 may employ the match building logic to write a GUI element link into the base GUI difference model. As another alternative, when a GUI element version mapping is available, the GAP comparison logic 242 may create a corresponding entry in the score table 266 based on the information available in the GUI element version mapping.

However, the GUI comparison logic 242 need not forgo the weighted analysis when a GUI element version mapping exists. Instead, the GAP comparison logic 242 may decide whether to proceed with the weighted mapping based on the confidence level provided in the GUI element version mapping. For example, when the confidence level exceeds a confidence threshold, the GAP comparison logic 242 may forgo execution of the weighted analysis. As another example, when the confidence level specifies manual mapping, the GAP comparison logic 242 may forgo execution of the weighted analysis.

The GAP comparison logic 242 uses the weighed analysis logic 250 to determine similarity values between each GUI element in the current GAP GUI model 238 and each element in the subsequent GAP GUI model 240. The weighted analysis logic 250 is described in more detail below. The weighted analysis logic records the similarity values in the weight table 258 as scores. The scores may be the similarity values, normalized similarity values, or based in some other way on the similarity values.

Having determined the similarity values, the GAP comparison logic 242 may use the match building logic 252 to determine whether GUI elements match between GAP versions. To that end, the match building logic 252 may compare the scores in the score table against the similarity threshold 272. GUI elements with scores that exceed the similarity threshold 272 may be considered matches under the assumption that the higher the similarity score, the more likely they refer to corresponding GUI elements. The match building logic 252 may create GUI element links in the base GUI difference model when matches are determined.

FIG. 3 shows an example of a portion 300 of a current GAP GUI model. The portion 300 uses an XML representation, but any other representation may be used instead. The portion 300 includes a GAP alias 302 ("University Directory0"), a GUI element identifier 304 ("0x90b52"), and GUI characteristics 306. The GUI characteristics 306 include a location with an x value of "173", a y value of "486", a width value of "336", and a height value of "274". Further GUI characteristics 306 include a class value of "WindowsForms10.LISTBOX.app4", a style value of "0x560100c1", and an extended style value of "0xc0000a00".

FIG. 4 shows an example of a corresponding portion 400 of a subsequent GAP GUI model using an XML representation. The corresponding portion 400 includes a GAP alias 402 ("University Directory1"), a GUI element identifier 404 ("0x90e66"), and GUI characteristics 406. The GUI characteristics 406 include a location with an x value of "248", a y value of "653", a width value of "299", and a height value of "24". Further GUI characteristics 406 include a class value of "WindowsForms10.COMBOBOX.app.0.378734a", a style value of "0x560100242", and an extended style value of "0xc0000800".

The GUI element with identifier 404 is a modified version of the GUI element with identifier 304. In other words, when the programmer designed the subsequent GAP version, the programmer modified the GUI element with identifier 304 to obtain the GUI element with identifier 404. In particular, FIGS. 3 and 4 show that the following changes have been made: the style changed from "0x560100c1" to "0x560100242" and the extended style changed from "0xc0000a00" to "0xc0000800". These differences in GUI element characteristics are not readily discernible to test script writers. However, other changes may be discernable to a programmer, such as the class change from "WindowsForms10.LISTBOX.app4" to "WindowsForms10.COMBOBOX.app.0.378734a".

FIG. 5 shows an example of a difference portion 500 of a GUI difference model. The difference portion 500 may include a current version section 502 including GUI element information drawn from the current GAP GUI model (e.g., parts of portion 300) and a corresponding subsequent version section 504 including GUI element information drawn from the subsequent GAP GUI model (e.g., parts of corresponding portion 400). The sections 502 and 504 may be separated by a first version element 506 and a second version element 508. In this example, the first version element 506 has a value of "0", while the second version element 508 has a value of "1". The "0" version element value may indicate that the section originated from a current GAP GUI model, where the "1" version element value may indicate that the section originated from a subsequent GAP GUI model.

The GUI difference model 244 may be in a flat configuration, where the GUI difference model 244 includes a single section 502 and a single corresponding section 504. Alternatively or additionally, the GUI difference model 244 may be in a tree, hierarchical, or nested configuration, where the GUI difference model 244 includes multiple sections 502 and multiple corresponding sections 504. In the tree, hierarchical, or nested configuration, similar GUI elements may be represented by a single node. Alternatively or additionally, similar GUI elements may be represented in separate nodes. The GUI difference model 244 may include all of the GUI elements of both of the GAP GUI models. Alternatively, the GUI difference model 244 may include only the elements of the second GAP GUI model and the corresponding portions of the first GAP GUI model. The GUI difference model 244 may be formed based on a bi-simulation algorithm as described in more detail below.

The GAP comparison logic 242 may create the difference portion 500 in the format presented in FIG. 5 when it combines the source GAP GUI model with the destination GAP GUI model under a root node. Alternatively or additionally, the GAP comparison logic 242 may create the difference portion 500 after the mapping retrieval logic 246 obtains a relevant mapping between the GUI element represented in the current version section 502 and the subsequent version section 504. Alternatively or additionally, the GAP comparison logic 242 may create the difference portion 500 after the match building logic 252 creates a link between the current version section 502 and subsequent version section 504.

Figure 6:
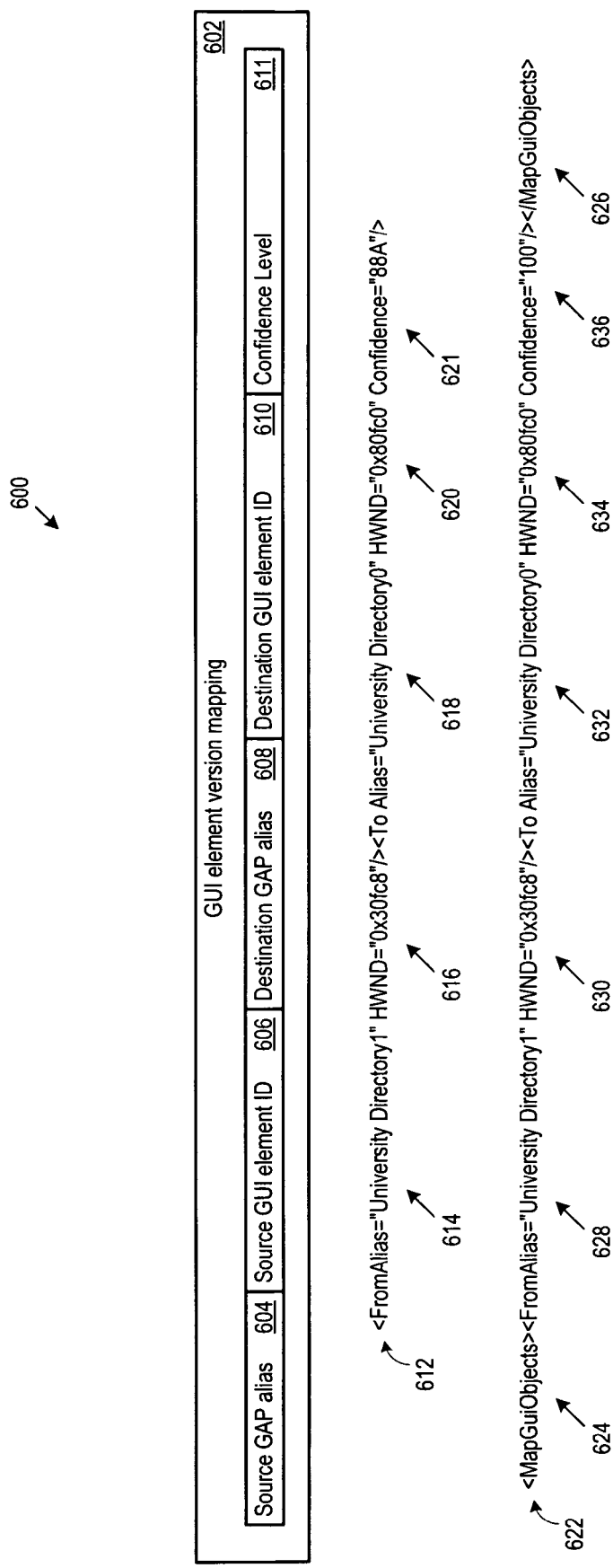
FIG. 6 shows examples of GUI element version mappings and a GUI element mapping specification message.

FIG. 6 shows examples 600 of GUI element version mappings and a GUI element mapping specification message. The version mapping 602 includes a source GAP alias 604, a source GUI element identifier 606, a destination GAP alias 608, and a destination GUI element identifier 610. Additional, fewer, or different fields may be included in the version mapping 602.

An optional extension to the GUI element version mapping 602 is the confidence level field 611. The confidence level field 611 may specify a degree of reliability for the GUI element version mapping. When the version mapping arises from the efforts of a human operator, for example, the confidence level field 611 may be relatively high (e.g., 90-100%). When the version mapping arises from an automated analysis, the confidence level field 611 may be set at a specified level (e.g., a predefined level for automated matching), or may be set at a threshold that depends on the strength of the automated analysis.

For example, the automated analysis described above may determine a normalized score representing a GUI element similarity value for any given attempt to match one GUI element to another GUI element. The confidence level field 611 may then specify the normalized score. The confidence level field 611 may further specify why the confidence level is set to any particular value. Furthermore, an explanation field (e.g., a character such as "M" or "A") may be included in the confidence level field 611 to denote that the confidence level arises from Manual or Automated analysis.

The source GAP alias 604 specifies an identifier for a GAP or GAP version (the "source GAP") that includes a first selected GUI element, while the destination GAP alias 608 specifies an identifier for a GAP or GAP version (the "destination GAP") that includes a second selected GUI element that should be linked to the first selected GUI element. The GAP aliases 604 and 608 may be unique identifiers that distinguish between GAPs or GAP versions, such as identifiers that differentiate the current GAP version and the subsequent GAP version. The source GUI element identifier 606 provides a unique identifier for the selected GUI element in the source GAP, while the destination GUI element identifier 610 provides a unique identifier for the selected GUI element in the destination GAP.

FIG. 6 also shows a specific example of a version mapping 612. The version mapping 612 specifies a source GAP alias 614 of "University Directory1", signifying the subsequent version of a university directory GAP. The source GUI element being mapped (e.g., a combo box), has the unique element identifier 616 "0x30fc8" tagged by a "HWND" label. The element mapping 612 also specifies a destination GAP alias 618 of "University Directory0", signifying the current version of a university directory GAP. The destination GUI element being mapped (e.g., a drop down listbox), has the unique element identifier 620 "0x80fc0" tagged by the "HWND" label. A confidence level field 621 is set to "88A". Thus, the version mapping 612 establishes that a particular drop down listbox in the subsequent version of the GAP corresponds to a particular combo box in the current GAP version with a confidence level of 88 as determined through an Automated mapping process.

FIG. 6 also shows an example of a GUI element mapping specification message 622. The GUI element mapping specification message 622 may include a GUI element mapping specification message header 624 and a GUI element mapping specification message terminator 626. The header 624 and terminator 626 signify that the data within the message specifies an element mapping between GUI elements in different GAPs or GAP versions. To that end, the GUI element type specification message 622 may further include a source GAP alias 628, a source GUI element identifier 630, a destination GAP alias 632, a destination GUI element identifier 634, and a confidence level 636.

Figure 7:
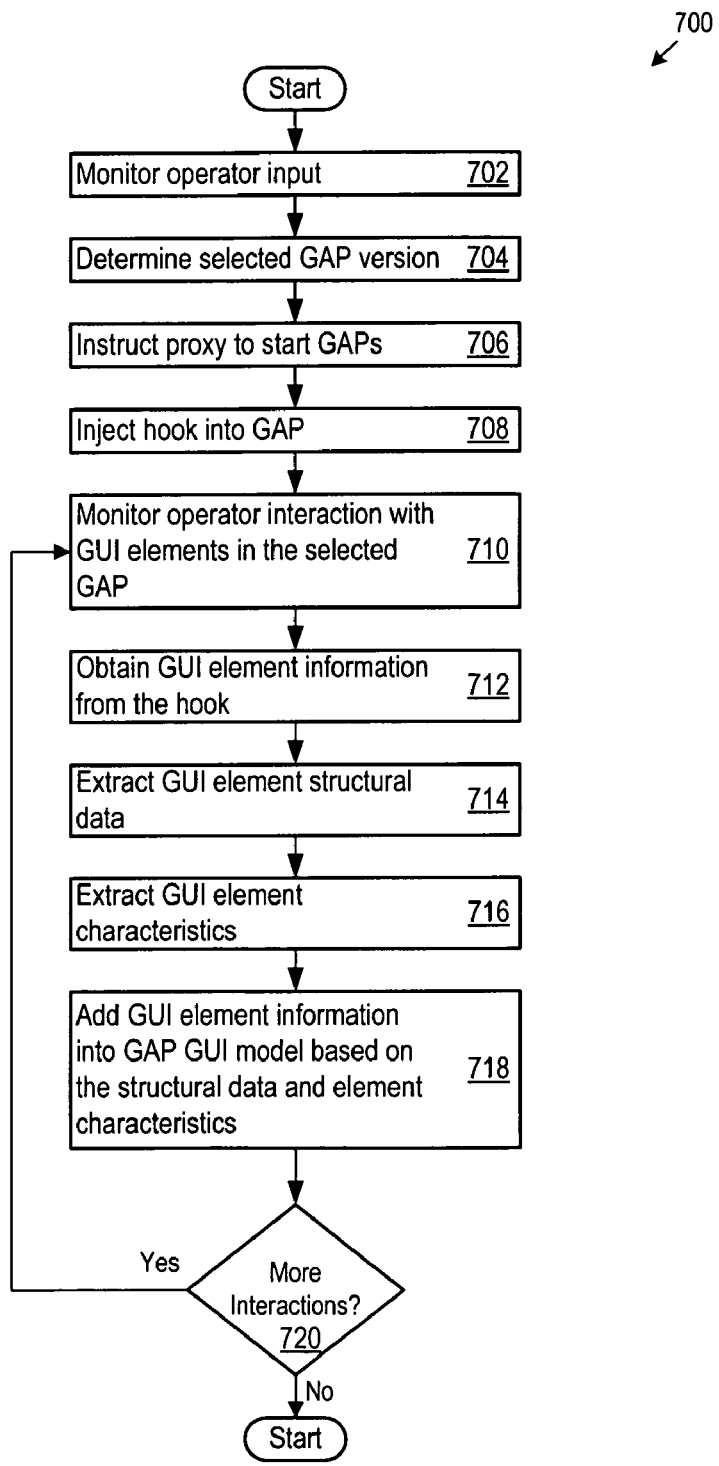
FIG. 7 shows a flow diagram for GUI model builder logic.

FIG. 7 shows a flow diagram 700 for the GUI model builder logic 220. The GUI model builder logic 220 may display a list of GAPs to choose from to the operator. As noted above, the list of GAPs may be established in the GAP table 224. The GUI model builder logic 220 monitors for operator input (702) to select a GAP. The GUI model builder logic 220 thereby determines a selected GAP version (704).

The GUI model builder logic 220 may then create a GAP load message, e.g., <LoadGap Alias="name"/> and send the GAP load message to the proxy 222 to start the selected GAP version, which may then display its GUI (706). After starting the GAP, the proxy 222 may inject a hook into the GAP's process space (708). The hook may connect to the proxy 222 and send a confirmation message (e.g., <GAP File="gap.exe" Instance="192"/>). The proxy 222 may send a success message (e.g., <Loaded Alias="name" VN="192" VN1="193"/>) to the GUI model builder logic 220, thereby acknowledging that the GAP is started successfully.

The accessibility layer, proxy, hook, and GUI model builder logic 220 monitor operator interaction with GUI elements in the selected GAP version (710). The GUI model builder logic 220 may send a state request message (e.g., <GetState Alias="name"/>) to the proxy 222 to obtain GUI element information from the hook (712). In turn, the proxy 222 may locate the connection to the corresponding hook in the selected GAP version and send a state request message (e.g., <GetState/>) to the hook. The hook may create a GAP state (including unique identifiers for GUI elements), such as a state tree, encode it (e.g., in XML format), and send it to the proxy 222. The proxy 222 may forward the GAP state to the GUI model builder logic 220. The GUI element information may be returned to the GUI model builder logic 220 one screen at a time, one GUI element at a time, an entire application at a time, or at some other discrete segmentation of the GAP.

The purpose of monitoring operating interaction with the GAP is to allow the GUI model builder logic 220 to record the structures of the screens and operator actions on the GAPs. The GUI model builder logic 220 intercepts operator events using the accessibility layer. Through these events, the GUI model builder logic 220 records the sequence of screens that the operator navigates through, as well as the actions that the operator performs on GUI elements. When recording the sequence of screens, the GUI model builder logic 220 obtains information about the structure of the GAP and the properties of the individual GUI elements using the accessibility-enabled interfaces. Accordingly, the GUI model builder logic 220 extracts GUI element structural data (714) and GUI element characteristics (716) from the information returned by the accessibility layer. The GUI model builder logic 220 uses the GUI element structural data and GUI element characteristics to add GUI element information into a GAP GUI model (718), e.g., on an element by element, screen by screen, or other incremental basis. The GUI model builder logic 220 may continue to build the GAP GUI model until the operator stops interacting with the selected GAP (720).

The GAP GUI model that results may be a full or partial capture of the entire GAP GUI structure. Thus, when the operator is interested in comparing specific pieces of a GUI between two GAPs, the operator may exercise only those pieces of interest. The GUI model builder logic 220 captures the specific pieces in a GAP GUI model specific to the pieces that the operator exercised, rather than every aspect of every GUI element in the entire selected GAP. The operator may run both the current GAP version 226 and subsequent GAP version 228 with the GUI model builder logic 220 to create the GAP Vn GUI model 238 and the GAP Vn+1 GUI model 240, respectively.

Figure 8:
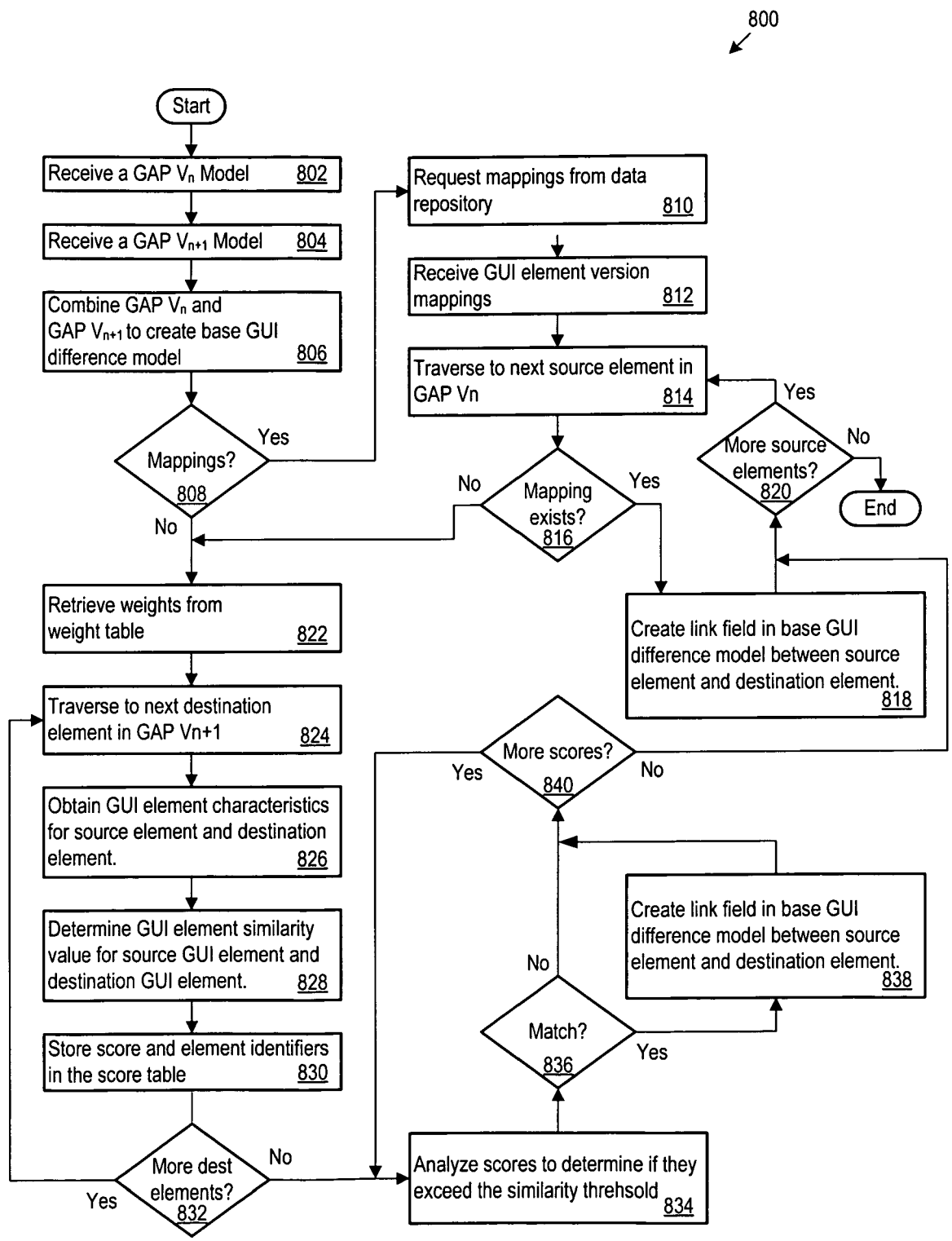
FIG. 8 shows a flow diagram for GAP comparison logic.

FIG. 8 shows a flow diagram 800 for a GAP comparison logic, such as GAP comparison logic 242. The GAP comparison logic 242 may receive a first GAP GUI model (802). For example, the GAP comparison logic 242 may access the GAP Vn GUI model 238 stored in the memory 204. The GAP comparison logic 242 may receive a second GAP GUI model (804). For example, the GAP comparison logic 242 may access the GAP Vn+1 GUI model 240 stored in the memory 204. Alternatively or additionally, the GAP comparison logic 242 may request and receive a first and second GAP GUI model from the communication logic 208.

The GAP comparison logic 242 may then combine the first GAP GUI model and the second GAP GUI model to create a base GUI difference model (806). The first and second GAP GUI models may be combined in a flat configuration. Alternatively or additionally, the first and second GAP GUI models may be combined in a tree, hierarchical, or nested configuration.

The GAP comparison logic 242 may then invoke the mapping retrieval logic 246. The mapping retrieval logic 246 may determine whether GUI element version mappings are available for the first GAP GUI model and the second GAP GUI model (808). This determination may be performed by querying a local source, such as the memory 204, for the GUI element version mappings. Alternatively or additionally, the mapping retrieval logic 246 may query a GUI element data repository 210 via the communication logic 208.

If the mapping retrieval logic 246 determines that GUI element version mappings are available, then the mapping retrieval logic 246 may request those GUI element version mappings (810). The request may be made to a local source, such as the memory 204. Alternatively or additionally, the request may be made to a GUI element data repository 210 via the communication logic 208. The request may be for specific mappings, such as for GUI element version mappings relevant for the next node. Alternatively, the request may be for all available GUI element version mappings. The mapping retrieval logic 246 may receive the GUI element version mappings in response to the request (812).

Alternatively or additionally, the determination of whether GUI element version mappings are available, the request, and the response may be combined into fewer actions. For example, the mapping retrieval logic 246 may just request the mappings. A response of GUI element version mappings may confirm that the mappings are available, while a negative or null response may confirm that the mappings are not available.

The mapping retrieval logic 246 may then return, and the GAP comparison logic 242 may then invoke the representation traversal logic 248. The representation traversal logic 248 may traverse to the next GUI element, i.e. a source GUI element, from the first GAP GUI model (814). In the case where the base GUI difference model is newly created, the traversal may be to the first GUI element. The traversal may be performed based on the first GAP GUI model. Alternatively or additionally, the traversal may be performed based on the representation of the first GAP GUI model within the base GUI difference model. The next node to visit may be determined, as examples, in depth-first or breadth-first fashion.

The GAP comparison logic 242 may then determine whether a GUI version mapping exists for the GUI element (816). The GAP comparison logic 242 may search within the retrieved GUI element version mappings to determine whether the mapping exists. If a mapping exists, then the GAP comparison logic 242 may create a link field in the base GUI difference model (818). The link field may include a GUI element identifier, such as a source GUI element identifier or a destination GUI element identifier. The link field may also include a GAP alias. The GAP comparison logic 242 may create a link field for just the source GUI element. Alternatively or additionally, the GAP comparison logic may create a link field for the destination GUI element.

The representation traversal logic 248 may then determine whether more source GUI elements are available (820). If more source GUI elements have not yet been traversed, then the representation traversal logic 248 cycles back and traverses to the next available source GUI element (814). If no source GUI elements are available, the GAP comparison logic 242 may terminate.

If either no GUI element version mappings exist or the mappings exist, but no mappings exist for the source GUI element, then the GAP comparison logic 242 may invoke the weighted analysis logic 250. The weighted analysis logic 250 may retrieve weights from a weight table (822). For example, the weighted analysis logic 250 may retrieve the weights from a weight table in the memory 204. Alternatively or additionally, the weighted analysis logic 250 may request and receive a weight table from the communication logic 208.

The representation traversal logic 248 may then traverse to the next GUI element, i.e. a destination GUI element, in the second GAP GUI model (824). In the case where no previous traversals in the second GAP GUI model have been made for a given source GUI element, then the representation traversal logic 248 may traverse to the first GUI element in the second GAP GUI model. The traversal may be performed based on the second GAP GUI model. Alternatively or additionally, the traversal may be performed based on the representation of the second GAP GUI model within the base GUI difference model. The traversal may be performed using a depth-first, breadth-first, or other traversal technique.

The weighted analysis logic 250 may then obtain GUI element characteristics for the source GUI element and the destination GUI element (826). The GUI element characteristics may include GUI element characteristics such as size, XY position, color, window position, font type, font size, border style, background color, foreground color, Read-only/Read-Write, or any other GUI element characteristic. Alternatively or additionally, the GUI element characteristics may include an accessibility layer Role, HWND, Class, Style, Extended Style, number of Children, Level within a tree or hierarchy, Name of the GUI element, or other accessibility layer-assigned properties. These GUI element characteristics may be obtained from the first and second GAP GUI model. Alternatively or additionally, the GUI element characteristics may be obtained from the base GUI difference model.

The weighed analysis logic 250 may then determine a GUI element similarity value for the source GUI element and the destination GUI element (828). The similarity value may be determined according to the following formula:

$$V_s = \sum_{i=1}^{N} W_i \cdot P_i$$

where $V_s$ is the similarity value, N is the number of characteristics or properties against which the similarity is being measured, $P_i$ is a value assigned to the differences between each property or characteristic, and $W_i$ is the corresponding weight for each property $P_i$. As one example:

$$V_s = W_R \cdot \text{Role}$$

where Role may be either 0 or 1 depending on whether the Role characteristics between the two GUI elements are different or the same, respectively, and $W_R$ may be the corresponding weight for the Role. The weight for the Role may be assigned a value indicative of the importance of the Role matching between GUI elements. For example, the weight of the Role may be very large in relation to the weight for other characteristics.

As another example:

$$V_s = W_R \cdot \text{Role} + W_c \cdot \text{Class}$$

where Class may be a count of how many terms in the Class property match, divided by the total number of terms in the Class property, and $W_c$ may be the corresponding weight for the Class. For example, a Class characteristic for a GUI element may be "WindowsForms10.LISTBOX.app4". If the Class characteristic for a corresponding GUI element is "WindowsForms10.COMBOBOX.app.0.378734a", then because the characteristics only match to a single place out of three or five places, the Class value may be either "⅓" or "⅕".

The GAP comparison logic 242 may then store in a score table a score based on the similarity value (830). Alternatively or additionally, the GAP comparison logic 242 may store the GUI element identifiers for the source GUI element and the destination GUI element along with the score in the score table. The score table may reside in the memory 204.

The GAP comparison logic 242 may then determine whether the representation traversal logic 248 has completed traversing the second GAP GUI model (832). If the representation traversal logic 248 still has more destination GUI elements to traverse, then the representation traversal logic 242 cycles back to traversing to the next destination element (824). If the representation traversal logic 248 has completed traversing the destination GUI elements, the GAP comparison logic 242 may invoke the match building logic 252.

The match building logic 252 may analyze either the similarity values determined by the weighted analysis logic 250 or the scores stored in the score table (834). The match building logic 252 may compare the values or scores against a similarity threshold to determine whether values or scores meet and/or exceed the similarity threshold. Alternatively or additionally, the values or scores may be compared against a difference threshold to determine whether the values or scores are at and/or below a difference threshold.

The match building logic 252 may determine whether the GUI elements match (836). This determination may occur when the values or scores exceed the similarity threshold. Alternatively or additionally, this determination may occur when the values or scores are not below a difference threshold.

If a match exists, then the GAP comparison logic 242 may create a link field in the base GUI difference model (838). The link field may include a GUI element identifier, such as a source GUI element identifier or a destination GUI element identifier. The link field may also include a GAP alias. The GAP comparison logic 242 may create a link field for just the source GUI element. Alternatively or additionally, the GAP comparison logic may create a link field for the destination GUI element.

After the GAP comparison logic 242 creates a link field, or if no match exists, then the match building logic 252 may determine whether more scores or similarity values need to be analyzed (840). This determination may depend on whether the score table still includes scores that have not been analyzed. If the GAP comparison logic 242 determines that more scores need to be analyzed, the match building logic 252 cycles back to analyzing the next score in the score table (834). If no unanalyzed scores exist in the score table, the match building logic 252 may return, and the GAP comparison logic 242 may cycle back to determining whether any more source GUI elements remain (820). Alternatively or additionally, the GAP comparison logic 242 may communicate any link fields created by the match building logic 252 to the GUI element data repository for storage as a GAP GUI element version mapping. The communication may use a GUI element version mapping message format as described in FIG. 6.

In another implementation, the GAP comparison logic 242 may execute a schema comparison to determine differences between the current GAP GUI and the subsequent GAP GUI. Given a schema representation (e.g., an XML schema representation) of the current GAP GUI and the subsequent GAP GUI, the GAP comparison logic 242 may compare the respective schemas. If these schemas are "equal", then the current GAP version and subsequent GAP version are the same. Otherwise, the current GAP version and the subsequent GAP version are different, and the GAP comparison logic 242 finds the differences.

For example, the XML schemas may be recorded in the XML format and each schema may have the root specified with the <schema> element. Data elements may be specified with the <element> and with the <attribute> tags. Each data element may be defined by its name and its type. Elements may be either of simple or complex types. Complex element types support nested elements while simple types are attributes and elements of basic types.

Extending the example, elements may have two kinds of constraints. First, values of elements may be constrained. The second kind of constraints specifies bounds on the number of times that a specific element may occur as a child of an element. These bounds are specified with the minOccurs and maxOccurs attributes of the <element> tag to represent the minimum and maximum number of occurrences. Elements may be grouped in a sequence if they are children of the same parent element. Attributes of the same element may also be grouped in a sequence. Each element or attribute in a sequence may be assigned a unique positive integer sequence number. This number may be used to access elements or attributes instead of using their names.

Schemas may be represented using graphs. Let T be finite sets of type names and F of element and attribute names (labels), and distinct symbols $\alpha \in F$ and $\beta \in T$. Schemas graphs are directed graphs G=(V, E, L) such that:

1) $V \subset T$, the nodes are type names or $\beta$ if the type name of data is not known;

2) $L \subset F$, edges are labeled by element or attribute names or $\alpha$ if the name is not known;

3) $E \subset L \times V \times V$, edges are cross-products of labels and nodes. If <l, vk, vm> $\in$ E, then vk→(l)→vm. Nodes vm are called children of the node vk. If an element has no children, then its corresponding node in a schema graph has an empty collection of children nodes;

4) Bounds for elements are specified with subscripts and superscripts to labels designating these elements. Subscripts are used to specify bounds defined by the minOccurs attribute, and superscripts designate the bounds specified by the maxOccurs attribute;

5) Each graph has the special node labeled root $\in$ V, where root represents a collection of the root elements. An empty schema has a single root node and no edges;

6) The XML tag <complexType> specifies that an element is a complex type, and it is not represented in the graph.

A path in a schema graph may be a sequence of labels PG=<l1, l2, . . . ln>, where vk→(ln)→vm for vm in V and 1 <=u <=n. The symbol $\beta$ may be used instead of a label in a path if an element is navigated by its sequence number. Function type:v→s returns the type s $\in$ T of the node v $\in$ V. Function max:label(u, l)→u returns the upper bound u, or $\infty$ if the upper bound is not specified, and function min:label(u, l)→l returns the lower bound l, or zero if the lower bound is not specified.

Once GAPs are modeled using XML schemas, these schemas can be compared using simulation to compute changes between the corresponding GAPs. That is, if the schema of the new GAP is the same as the schema of the previous release of the GAP, or the types of its GUI objects are subsumed by the types of the corresponding GUI object of the previous GAP, then these schemas may be considered identical. Otherwise, the GAP comparison logic 242 may issue a warning and GUI objects with the associated modification types are reported.

To that end, the GAP comparison logic 242 may implement a bi-simulation technique to compare schemas. FIG. 12 shows an example of the bi-simulation properties 1200 that the GAP comparison logic 242 may employ, including a first bi-simulation property 1202, a second bi-simulation property 1204, a third bi-simulation property 1206, and a fourth bi-simulation property 1208.

The bi-simulation may be a binary relation between the nodes of two graphs g1, g2 ∈ G, written as x~y, x, y ∈ V, satisfying the bi-simulation properties 1202-1208.

The GAP comparison logic 242 may consider two finite graphs g1, g2 ∈ G equal if there exists a bi-simulation from g1 to g2. A graph is bi-similar to its infinite unfolding. The GAP comparison logic 242 may compute the bi-simulation of two graphs starts with selecting the root nodes and applying the bi-simulation properties 1202-1208. The GAP comparison logic 242 search for a relation (x, y) between nodes x and y in a graph that fails to satisfy the bi-simulation properties 1202-1208. When such a relation (x, y) is found, then the GAP comparison logic 242 determines that the graphs are not equal and the bi-simulation may stop.

For example, consider the current schema 1210 and the subsequent schema 1212 in FIG. 12. The GAP comparison logic 242 applies bi-simulation to determine whether two schemas 1210 and 1212 are equivalent. The schema 1210 describes XML data that models a current GUI screen, and the schema 1212 models a modified version of the current GUI screen. The comparator logic 242 may determine that If the schema 1212 is equivalent to the schema 1210, then the GUI screens are the same.

The GUI comparison logic 242 selects the root nodes 1214 and 1216 in both schemas 1210 and 1212 that satisfy the first bi-simulation property 1202 and the second bi-simulation property 1204. The GAP comparison logic 242 may then select the relation root(book)—>α 1218 from the schema 1210 and check to see that the third bi-simulation property 1206 holds for the relation root(root)—>α 1220 in the schema 1212.

Since it does, the GAP comparison logic 242 determines whether the fourth bi-simulation property 1208 holds for both relations. Since it does, the GAP comparison logic 242 proceeds to the relation α—>(author1) —>α 1222 for the schema 1210 and the relation α—>(author1) —>α 1224 for the schema 1212. The GAP comparison logic 242 determines that the third bi-simulation property 1206 and the fourth bi-simulation property 1208 are violated. In particular, the GAP comparison logic 242 determines that the offending relation 'author' is tagged as potentially deleted in the schema 1212, a difference from the schema 1210. Thus, the schemas 1210 and 1212 are not equal.

Figure 9:
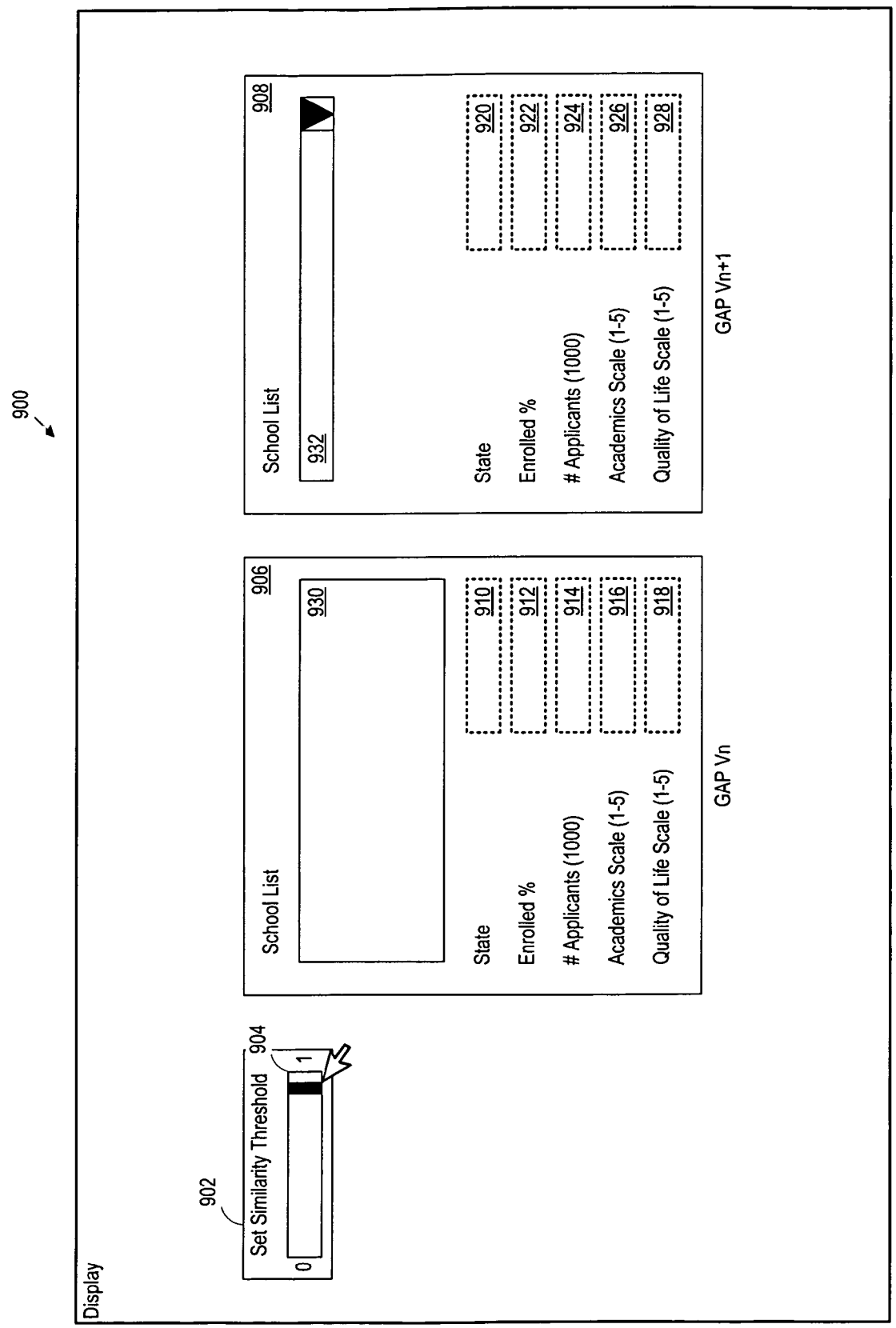
FIG. 9 shows a display and a GUI comparator threshold interface.

FIG. 9 shows a display 900 and a GUI comparator threshold interface 902. The GUI difference model logic 280 may display the interface 902 in response to operator input. For example, the operator may select an option configuration item from a menu generated by the GUI difference model logic 280. In response, the GUI difference model logic 280 displays the interface 902. The display may be provided locally, e.g. via display 206, or remotely, e.g. via terminal 218.

In the example shown in FIG. 9, the interface 902 includes a slider 904 that selects a value between 0 and 1. Any other interface or value range may be provided to the operator. The GUI difference model logic 280 may set the difference threshold based on the value of the slider 904. The value 0 represents that essentially no or limited similarity is needed to find a match between GUI elements. The value 1 represents that very close or exact similarity is needed to find a match between GUI elements. Such similarity may be found in manual mappings, for example, as specified in a high confidence level field 611 (e.g., "100M") as received from the metadata repository. However, a very high level of confidence may also be obtained through the automated weighting analysis described above, and the GUI difference model logic 280 may, in some implementations, accept a manual version mapping as correct regardless of the associated confidence level.

FIG. 9 also shows a portion 906 of the current GAP version 226 and a portion 908 of the subsequent GAP version 228. In addition to allowing the operator to set the difference threshold using the interface 902, the GUI difference model logic 280 may further include visualization logic 278. The visualization logic 278 may display elements in the current GAP version and the subsequent GAP version that match, as determined by the weighted comparison analysis, the similarity threshold, and the version mappings. Matching GUI elements may be highlighted with a border of a particular pattern or color, or in other manners, and different borders, colors, or other features may be used for each match.

In FIG. 9, the visualization logic 278 highlights matching GUI elements based on the similarity threshold set through the interface 902. The similarity threshold is relatively high. In the example shown in FIG. 9, the visualization logic 278 highlights the textbox elements 910, 912, 914, 916, and 918 in the portion 906 of the current GAP version 226, that match, respectively, to the textbox elements 920, 922, 924, 926, and 928 in the portion 908 of the subsequent GAP version 228. The textbox elements 910-928 have little or no changes in their characteristics between the subsequent GAP versions. The textbox element 930 and the combo box element 932 remain un-highlighted, however, because their characteristics differ to a greater extent, and the weighted comparison analysis does not determine a GUI element similarity value that exceeds the similarity threshold.

Figure 10:
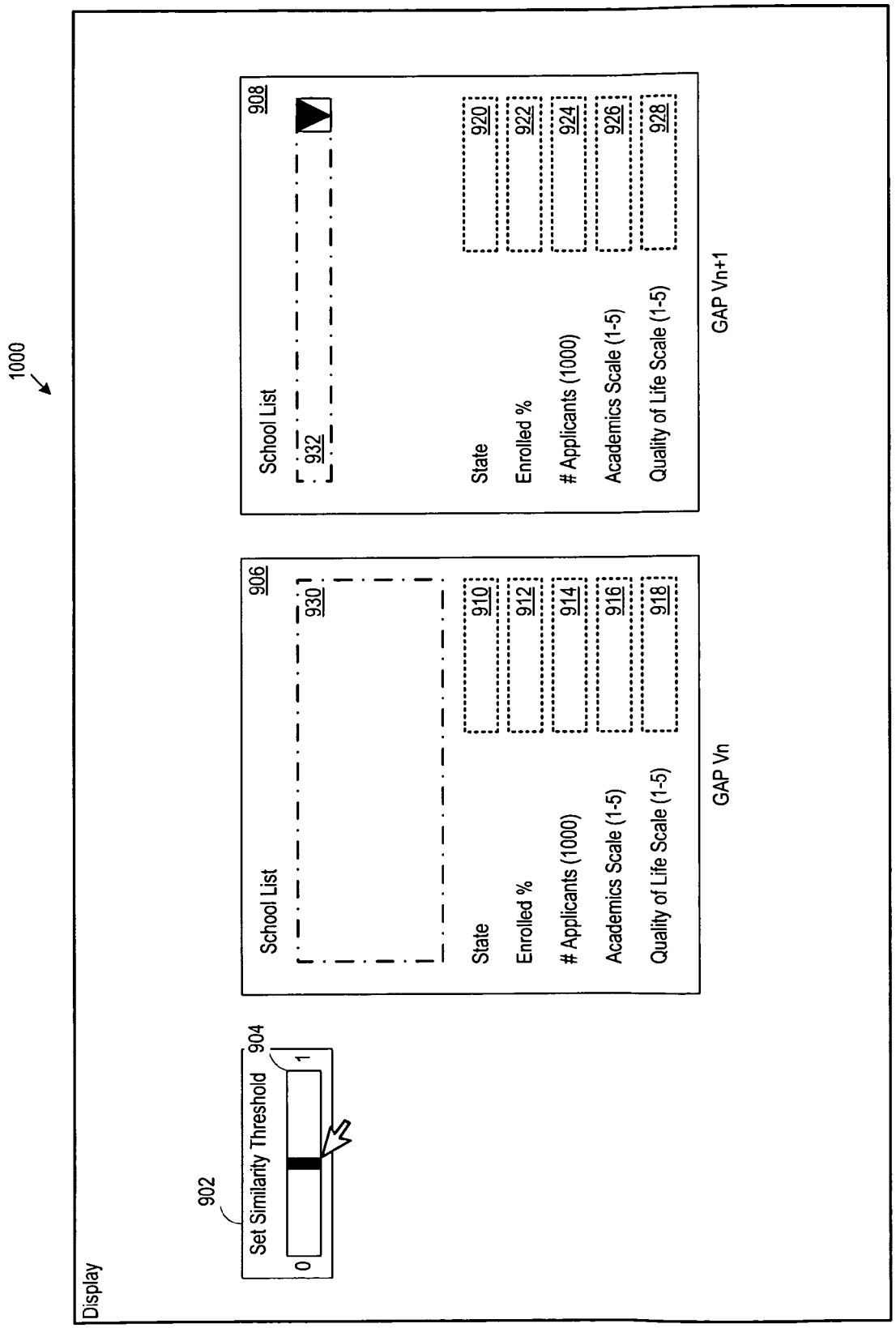
FIG. 10 shows GUI element highlighting responsive to the comparator threshold slider.

In FIG. 10, the display 1000 shows that the slider 904 has been adjusted to a lower similarity threshold. The visualization logic 278 highlights the matching GUI elements based on the lower similarity threshold set through the interface 902. In the example shown in FIG. 10, the visualization logic 278 highlights, as before, the textbox elements 910, 912, 914, 916, and 918 in the portion 906 of the current GAP version 226, that match, respectively, to the textbox elements 920, 922, 924, 926, and 928 in the portion 908 of the subsequent GAP version 228.

However, the visualization logic 278 also highlights the textbox element 930 and the combo box element 932. Although the characteristics of the textbox element 930 and the combo box element 932 differ to a certain extent, the weighted comparison analysis does obtain a GUI element similarity value that exceeds the similarity threshold. Accordingly, the visualization logic 278 highlights the elements 930 and 932.

Figure 11:
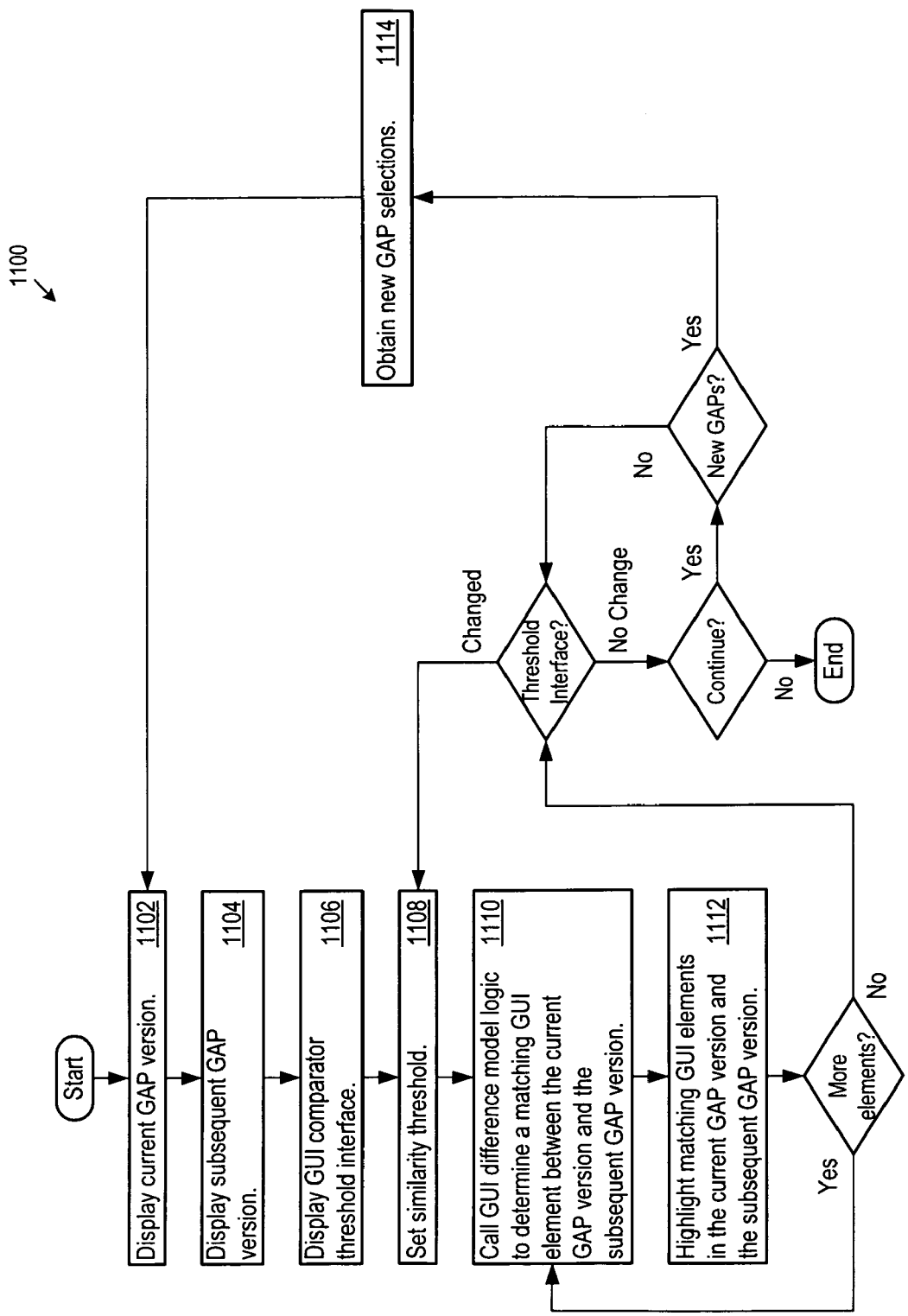
FIG. 11 shows a flow diagram for visualization logic.

FIG. 11 shows a flow diagram 1100 for visualization logic 278. The visualization logic 278 may display the current GAP version 226 (1102) and the subsequent GAP version 228 (1104). For example, the visualization logic 278 may issue one or more GAP load messages to the proxy 222 to start the current GAP version 226 and the subsequent GAP version 228.

The visualization logic 278 also may display a GUI comparator threshold interface 902 (1106). The visualization logic 278 may set the similarity threshold based on the value chosen through the GUI comparator threshold interface 902 (1108). Given the similarity threshold, the visualization logic 278 may call the GUI difference model logic to determine a matching GUI element between the current GAP version 226 and the subsequent GAP version 228 (1110). Alternatively, the visualization logic 278 may execute a comparison analysis (e.g., the weighted comparison analysis described above) to determine one or more GUI elements in the subsequent GAP version 228 that match any particular element in the current GAP version. The visualization logic 278 may accept an element selection from the operator that specifies one or more particular GUI elements of interest in either GAP version, and find the matching GUI elements in the other GAP version. Alternatively, the visualization logic 278 may consider each GUI element in the current GAP version 226 and find the matching GUI elements in the subsequent GAP version 228.

The visualization logic 278 highlights matching GUI elements in the current GAP version 226 and in the subsequent GAP version 228 (1112). To that end, the visualization logic 278 may issue commands to the proxy to highlight any particular GUI elements. If there are more GUI elements to consider, the visualization logic 278 attempts to find additional matches.

At any time, the visualization logic 278 may check to determine whether the GUI comparator threshold interface 902 has changed (e.g., the operator changed the slider position to select a new threshold value). The visualization logic 278 may also check, at any time, whether the operator desired to review different GAPs. If so, the visualization logic 278 obtains new GAP selections (1114). The visualization logic then displays the GAPs and the GUI comparator threshold interface and proceeds as noted above.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product comprising:
a memory;
a similarity threshold stored in the memory;
a current graphical user interface (GUI) application (GAP) GUI model stored in the memory, the current GAP GUI model including a first source GUI element;
a subsequent GAP GUI model stored in the memory, the subsequent GAP GUI model including a first destination GUI element; and
GAP comparison logic stored in the memory, the GAP comparison logic comprising:
weighted analysis logic operable to:
determine a similarity value based on the first source GUI element and the first destination GUI element; and
modify the similarity threshold based on an operator input;
match building logic operable to:
create a first GUI element link between the first source GUI element and the first destination GUI element when the similarity value exceeds the similarity threshold; and
highlight matching GUI elements between the current GAP version and the subsequent GAP version responsive to the similarity threshold.

2. The product of claim 1, further comprising: mapping retrieval logic operable to obtain a GUI element version mapping between a second source GUI element in the current GAP GUI model and a second destination GUI element in the subsequent GAP GUI model.

3. The product of claim 2, where the match building logic is further operable to: create a second GUI element link between the second source GUI element and the second GUI destination element.

4. The product of claim 3, where GAP comparison logic is further operable to: forgo execution of the weighted analysis logic when the GUI element version mapping is obtained.

5. The product of claim 1, where the GAP comparison logic further comprises: weighted analysis logic operable to determine the similarity value.

6. The product of claim 5, where the weighted analysis logic is operable to: determine the similarity value as a weighted sum of GUI element characteristics.

7. A product comprising:
a memory;
a base graphical user interface (GUI)difference model stored in the memory; and
GAP comparison logic stored in the memory and operable to:
analyze a first GUI element in a current graphical user interface application (GAP) version against a second GUI element in a subsequent GAP version to determine a first similarity value;
insert a GUI element link from the first GUI element to the second GUI element in the base GUI difference model when the first similarity value exceeds a similarity threshold;
modify the similarity threshold based on an operator input; and
highlight matching GUI elements between the current GAP version and the subsequent GAP version responsive to the similarity threshold.

8. The product of claim 7, further comprising: a weight table stored in the memory and comprising GUI characteristic weights; and where the GAP comparison logic retrieves the GUI characteristic weights to determine the similarity value.

9. The product of claim 8, where the similarity value comprises: a sum of GUI element characteristics weighted by the GUI characteristic weights.

10. The product of claim 7, where the GUI element link comprises an identifier of the second GUI element.

11. The product of claim 7, where the GUI element link further comprises a matching score based on the first similarity value.

12. The product of claim 7, where the GAP comparison logic is further operable to: analyze the first GUI element against multiple GUI elements in the subsequent GAP version, including the second GUI element, to determine multiple similarity values, including the first similarity value.

13. A method comprising:
- analyzing a first graphical user interface (GUI)element in a current graphical user interface application (GAP) version against a second GUI element in a subsequent GAP version to determine a first similarity value;
- inserting a GUI element link from the first GUI element to the second GUI element in the base GUI difference model when the first similarity value exceeds a similarity threshold;
- modifying the similarity threshold based on an operator input; and
- highlighting matching GUI elements between the current GAP version and the subsequent GAP version responsive to the similarity threshold.

14. The method of claim 13, further comprising: retrieving GUI characteristic weights from a weight table for determining the similarity value.

15. The method of claim 14, further comprising: determining a sum of GUI element characteristics weighted by the GUI characteristic weights as the first similarity value.

16. The method of claim 13, further comprising: analyzing the first GUI element against multiple GUI elements in the subsequent GAP version, including the second GUI element, to determine multiple similarity values, including the first similarity value.

\* \* \* \* \*

UNITED STATES PATENT AND TRADEMARK OFFICE
CERTIFICATE OF CORRECTION

| | |
|---|---|
| PATENT NO. | : 8,185,917 B2 |
| APPLICATION NO. | : 12/038661 |
| DATED | : May 22, 2012 |
| INVENTOR(S) | : Mark Grechanik et al. |

Page 1 of 1

It is certified that error appears in the above-identified patent and that said Letters Patent is hereby corrected as shown below:

In the Claims

In Claim 1, Column 18, lines 21 and 22

After "highlight matching GUI elements between"

change "the current GAP version and the subsequent GAP version"

to "a current GAP version and a subsequent GAP version"

Signed and Sealed this
Eighth Day of April, 2014

Michelle K. Lee
*Deputy Director of the United States Patent and Trademark Office*